Dec. 8, 1936.  H. A. FARRAND  2,063,422
COILABLE MEASURING DEVICE
Filed Feb. 24, 1932  2 Sheets-Sheet 1
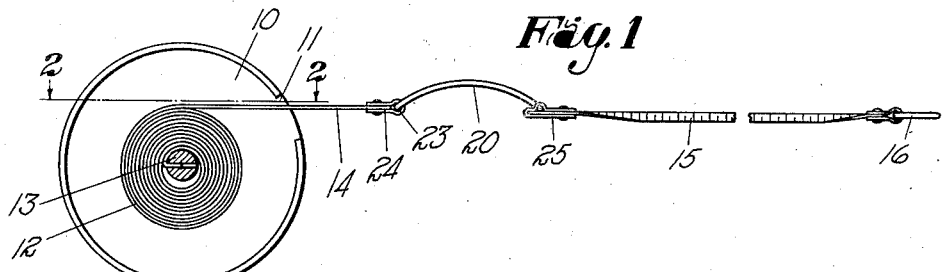
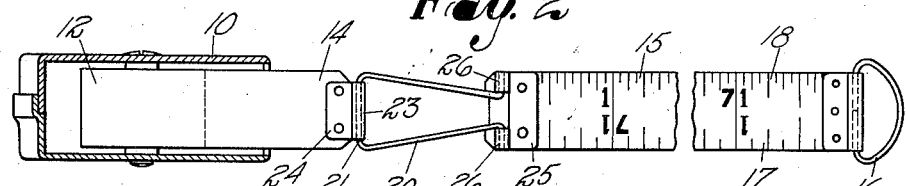
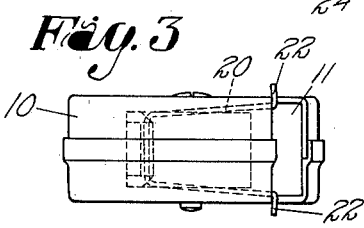
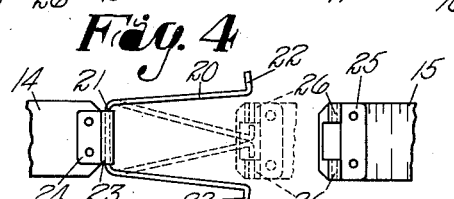
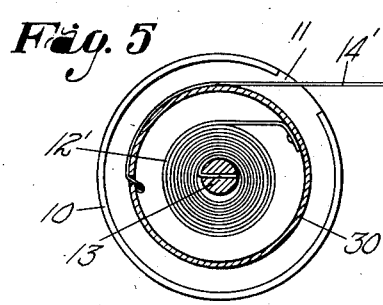
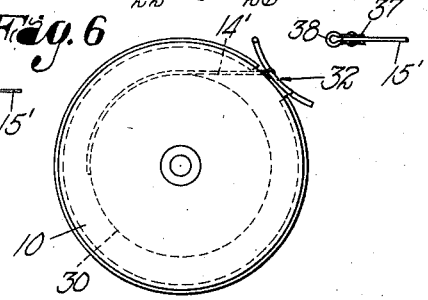
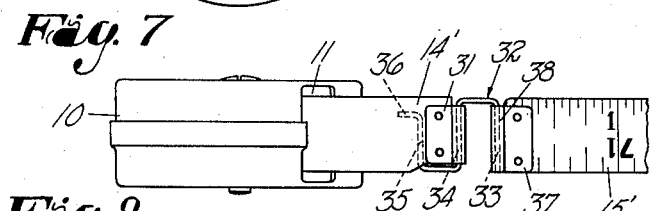
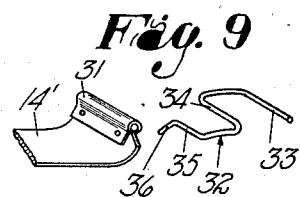
Inventor
Hiram A. Farrand
By W. Clay Lindsey
Attorney

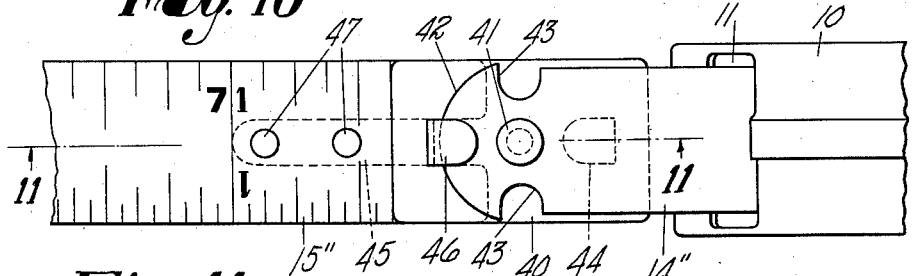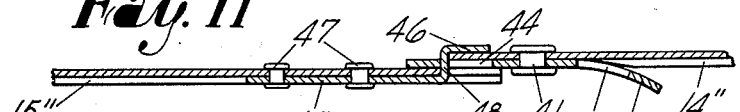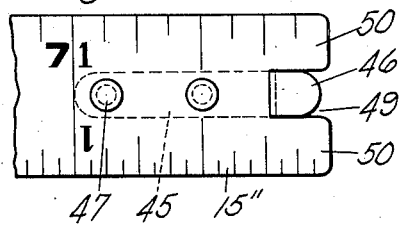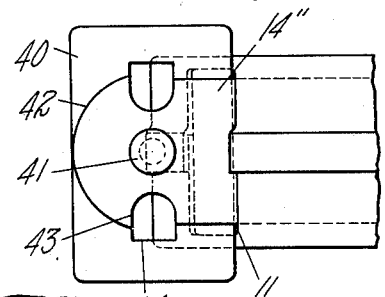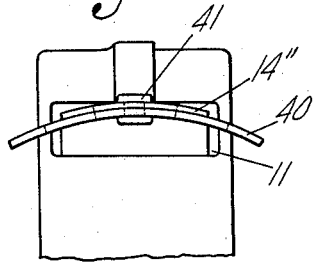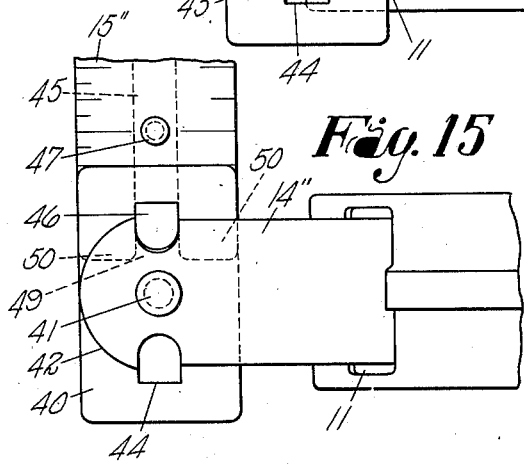

Patented Dec. 8, 1936

2,063,422

UNITED STATES PATENT OFFICE 2,063,422

COILABLE MEASURING DEVICE

Hiram A. Farrand, Berlin, N. H., assignor to Hiram A. Farrand, Inc., Berlin, N. H., a corporation of New Hampshire Application February 24, 1932, Serial No. 594,859

16 Claims. (Cl. 33—138)

This invention relates to that class of measuring devices which includes steel tapes or coilable rules, and particularly those measuring devices having a steel tape or rule which is automatically wound or aided into coils by suitable resilient means, usually in the form of a coiled spring attached to the container or casing within which the steel tape or rule is wound.

It is customary in devices of this sort to permanently attach the coilable measuring strip to a winding mechanism which includes a coiled spring, commonly provided with sufficient tension to overcome the resistance which friction of the parts and the bending of the strip offers to winding so that, when the strip is drawn out, the tension of the spring is thereby increased and power is stored therein; then, when the strip is released, it is immediately and automatically rewound into a coil unless checked by some means provided for that purpose. This means may take the form of a ratchet and pawl device or a frictional brake device which serves to hold the measuring strip at any particular position to which it has been extended and which may be manually controlled to release the resilient means and permit it to wind up the measuring strip.

It has also been proposed to provide a device of this kind wherein the tension of the resilient means is only such as to approximately balance the resistance of friction and the tendency of the measuring strip to resist bending and, with such an arrangement, the return of the measuring strip into its casing into coiled form is accomplished by pushing in on the strip. When this is done, the balance normally established is overcome so that the resilient member assumes a more closely coiled condition and takes up the slack. In this type of measuring device the use or need of means for checking the inward movement of the measuring strip would depend upon the degree of tension provided in the coiled spring.

In any event, it has been the universal practice in measuring devices of this sort to permanently connect one end of the measuring strip to the resilient means in order to insure against the loss of the proper relationship between the measuring portion and its resilient winding means, it being evident that if the measuring strip were disconnected and the spring permitted to unwind owing to the energy which has been stored up therein, the free end of the spring would be drawn into the casing, requiring disassembly of the parts in order to again make the connection. In re-assembling the parts, considerable skill would be required in rewinding the spring so it has the desired predetermined tension. Even where the measuring device has the usual regulating means, such as a pawl and ratchet device or frictional brake device, there is a possibility of the resilient spring discharging its stored energy after the measuring strip has been disconnected, due to failure of such regulating means such as may occur if the device were dropped onto the floor.

Now it is of distinct disadvantage to have the measuring strip permanently connected to the winding means because of the inconvenience, and sometimes inability, to utilize either end of the measuring scale as a starting point when it is desired to take measurements. It is usually necessary in taking measurements on such scales to begin at the unattached end which is opposite to the container or winding device. In many instances, it is necessary in taking measurements, to turn the entire device end for end, an operation which is very inconvenient. These statements particularly apply to measuring devices having rules consisting of a metallic strip having a convex cross section and which is sufficiently flexible to permit of its being coiled but of sufficient stiffness and resiliency to cause it to remain in substantially straight or unrolled condition when not coiled. In such instances, it may be desired to hold the rule at one end and leave the other end suspended or to move the strip longitudinally from one position to another when taking a succession of measurements between spaced points.

The aim of the present invention is to provide an improved measuring device of the character described wherein the above and other objects and disadvantages incident to structures heretofore made are obviated or overcome. To these ends, I provide means whereby the measuring strip may be quickly and easily detached from the winding device, and accidental discharge of the stored energy of the tensioning means is positively guarded against after the strip is detached. Due to the fact that the measuring strip is detachable, it is more convenient in use, particularly in that measurements can be easily taken by starting from either end of the measuring strip; the strip may be more conveniently and readily handled as it is not weighted at one end by the casing; and, when taking a measurement between distant points, the strip may be successively moved between those points. It is also possible to employ to the best advantage a double graduated strip, one scale starting from one end of the strip and the other scale from the other end, the two scales reading, of course, in opposite directions.

A further aim of the invention is to so constitute the detachable connection between the measuring strip and resilient means that a part of the connection or an element associated therewith automatically comes into play when the strip is disconnected in order to prevent the outer end of the tensioning means from being drawn into the case and the coil from accidentally losing its stored power; and, when the measuring strip is connected to the resilient means, the part or element which serves to anchor the resilient means while the strip is detached is inoperative so that it will not interfere with the unwinding or winding up of the strip within the casing.

A still further aim of the invention is to provide arrangements wherein the above and other objects are accomplished and which are particularly characterized by their extreme simplicity in construction, the ease and facility with which the measuring strip may be disconnected from and connected to the tensioning means, and by their effectiveness in operation.

Other objects will be in part obvious, and in part pointed out more in detail hereinafter.

The invention accordingly consists in the features of construction, combination of elements and arrangement of parts which will be exemplified in the construction hereinafter set forth and the scope of the application of which will be indicated in the appended claims.

In the accompanying drawings, wherein I have shown, by way of illustration, several embodiments which my invention may take, Fig. 1 is a side view of a measuring device constructed in accordance with one embodiment of the invention, one half of the casing being removed and a measuring strip being shown as having been completely withdrawn from the casing;

Fig. 2 is a top plan view of what is shown in Fig. 1;

Fig. 3 is an edge view of the casing, showing one part of the detachable connection in position for preventing the spring from uncoiling after the measuring strip has been disconnected;

Fig. 4 is a detailed view of the detachable connection, the full lines showing the parts disconnected and the dotted lines illustrating the manner of connecting the parts;

Fig. 5 is a view similar to Fig. 1 but showing another embodiment of the invention;

Fig. 6 is a side view of the device shown in Fig. 1, the measuring strip having been disconnected and one part of the detachable connection being shown as holding the winding device against uncoiling;

Fig. 7 is a top plan view of what is shown in Fig. 5;

Fig. 8 is a top plan view of what is shown in Fig. 6;

Fig. 9 is a detail view of the pivoted part of the detachable connection and one end of the strap end;

Fig. 10 is a top plan view of the device showing still another embodiment of the invention, a portion of the case being shown in edge view and a portion of the measuring strip being shown in face view;

Fig. 11 is a longitudinal section view through the strip and detachable connection shown in Fig. 10, this view being taken substantially on line 11—11 of that figure;

Fig. 12 is a view of one end of the measuring strip, the same being shown detached;

Fig. 13 is a view showing the manner in which the one element of the detachable connection of this embodiment prevents the winding device from unwinding after the measuring strip has been disconnected;

Fig. 14 is a view of what is shown in Fig. 13, the same being taken at right angles to that view; and Fig. 15 is a view similar to Fig. 10 but illustrating the measuring strip at right angles to the position it had in Fig. 10 in order to disconnect the strip from the strap of the winding device.

Referring to the drawings in detail, and particularly to the first embodiment shown in Figs. 1 to 4, inclusive, 10 designates a casing or holder of any suitable size or configuration, it being shown, in the present instance, as comprising two generally round or cup-shaped parts suitably connected together and having an entrance opening or slot 11 in its peripheral wall. Within the casing is a suitable winding device which may be of either of the types described, that is, of the type wherein the coiled spring has of itself sufficient power or tension to withdraw the measuring strip completely into the casing, or of the type wherein the coiled spring is set at such a low tension that it does not of itself overcome the resiliency of the measuring strip or the friction of the parts but assists in taking up the slack when the measuring device is pushed endwise back into the casing. In this embodiment, the latter type of tensioning device is illustrated. It may consist of a thin metallic ribbon 12 a portion, particularly the inner portion, of which may have a predetermined set or, if desired, the natural resiliency of the strip may be relied upon without giving any definite set thereto in coiled condition. One end of this ribbon is connected to a fixed central stud 13 in any suitable manner. The outer end of the ribbon, for convenience, may be termed the strap end of the winding device, and is designated by the numeral 14. Obviously, the device may be provided with suitable manually manipulable means for regulating the spring device such, for example, as a pawl and ratchet means or a frictional brake means, and this is particularly true in case the winding device is of the type wherein the spring has sufficient tension within itself to, when released, completely withdraw the measuring strip into the casing. The measuring strip is designated generally by the numeral 15 and, while this strip may take any suitable form, it is shown as comprising a metal ribbon curved to have a concavo-convex cross section. A rule or measuring strip of this kind is disclosed in my Patent No. 1,402,589 granted Jan. 3, 1922. It may have, at one end, the usual ring or loop 16. In the present instance, this strip has, on one face and at opposite edges, scales 17 and 18 which respectively begin from the opposite ends of the strip.

Referring now to the detachable connection between the strap end 14 and the measuring strip 15, this includes, in the present illustrated disclosure, a spring element 20 which may comprise a length of resilient wire bent generally into U-shape so as to provide a pair of resilient arms and a cross portion 21. The free ends of the arms are turned outwardly in opposite directions in order to form pins or studs 22. The cross portion of the spring member 20 is journaled in a knuckle 23 of a clip 24 connected to the strap end in any suitable manner. Obviously, the strip itself might be folded back upon itself in order to form this knuckle. The other element 25 of the detachable connection and which element is connected to one end of the measuring strip 15, is provided with a pair of eyes 26 which are adapted to respectively receive the pins 22, as shown most clearly in Fig. 2. This element 25 may be in the form of a sheet metal clip folded back upon itself, the end of the measuring strip being interposed between the folds. The eyes may be formed by providing a transverse rib on the clip, the central portion of the rib being removed in order to provide a space between the two eyes for accommodating the free ends of the arms during the operation of connecting the two detachable parts.

With this arrangement, it will be observed that when it is desired to disconnect the measuring strip from the winding or tensioning device, the strip is pulled out its full length so as to expose the detachable connection and then the two arms of the element 20 are urged towards each other, as shown in broken lines in Fig. 4, to completely withdraw the pins from the eyes. When the element 20 is released, the arms spring outwardly away from each other to such an extent that the distance between the free ends of the pins is greater than the length of the entrance opening or slot 11 in the casing. Now, should the tension device tend to unwind, the pins will catch on the casing, as shown in Fig. 3, so that unwinding is prevented and the free end of the strap 14 is readily available whenever it is desired to again connect the measuring device to the strap. The measuring strip, having been disconnected, can be very conveniently used, and it is feasible to employ to the best advantage either of the scales with which the strip is provided. When it is desired to again wind up the strip within the casing, the strap may be connected to the strip by merely compressing the arms of the element 20, as shown in Fig. 4, bringing the pins into the space between the eyes 26 and then releasing the arms, whereupon they will spring apart to the position shown in Fig. 2.

Referring now to the embodiment shown in Figs. 5 to 9, inclusive, the measuring rule is shown by way of illustration only, as having a winding instrumentality of conventional type which includes a drum 30 rotatably mounted in the casing or holder 10, and a coiled spring 12' one end of which is connected to a fixed stud 13 and the other end of which is connected to the drum 30. Secured to the drum so that it will lie upon the exterior surface thereof, is a strap end 14', the free end of which carries a clip 31. In this arrangement, the spring 12' may have sufficient tension within itself to completely coil the measuring strip 15' when the spring is released. The spring may be regulated by suitable means, such as a frictional brake or a pawl and ratchet device, neither of which is shown, as they are old and well known constructions. The measuring strip 15' may comprise a metallic ribbon either flat in cross section or concavo-convex in cross section, the former being shown by way of illustration. It is preferably provided with two scales, the respective zero marks of which are disposed at opposite ends of the strip; that is to say, the scales read in opposite directions.

In this embodiment, (Figs. 5 to 9) the detachable connection between the strap end 14' and the measuring tape 15' includes an element 32 which comprises a length of wire bent into reverse or double U-shape so as to provide three parallel bars 33, 34, and 35, the central one 34 of which is journaled in the knuckle of the clip 31. The bar 35 may have its free end turned over at right angles so as to provide a finger 36. The other element of the detachable connection comprises a clip 37 secured to the end of the measuring tape 15' and having an eye or sleeve 38 at the extreme end of and in the plane of the tape. This eye is adapted to receive the end bar or pin 33 of the pivoted piece 32. By preference, the element 32 is longitudinally curved, as shown most clearly in Figs. 5 and 6, and the end of the resilient strap 14', when the tension is removed therefrom, is normally curved in the opposite direction, as shown most clearly in Fig. 9.

When it is desired to disconnect the measuring strip 15' from the strap end 14', the measuring strip is pulled out to its full length so as to expose the detachable connection, as shown in Fig. 5. Then the attached end of the measuring strip is moved sidewise in order to slip the sleeve 38 from the pin or arm 33. When this is done, the now free end of the strap 14' will bend or curl slightly, as shown in Fig. 9, thereby bringing the pivoted piece 32 at a more pronounced angle to the plane in which the strap end and the tape move when the same are drawn into and out of the casing. Now, should the winding device for any reason begin to uncoil, the pivoted piece is drawn towards the opening 11 in the casing or holder and the finger 36 of the pivoted piece will engage the peripheral wall of the casing below the lower edge of the opening therein so that the finger piece will be brought to the position shown in Figs. 6 and 8. It will be noted that, when the finger piece is in this position, it bridges the opening 11 in the casing. It thus constitutes a positive lock for preventing the coil from unwinding and losing its power. When it is desired to again connect the measuring tape to the winding device, the tape is brought to the position shown in Fig. 8 and then moved sidewise to engage the sleeve 38 about the pin 33. The tape may then be pulled lengthwise so as to draw out the strap end 14 sufficiently to permit the pivoted piece to assume the position shown in Fig. 5. When the regulating means is operated to cause the winding device to coil up the measuring strip upon the drum 30, the tension on the strap 14 is such as to cause the free end thereof to lie flat and thus permit the pivoted piece 32 to move through the slot or opening in the casing without striking the peripheral wall of the casing.

Referring now to the embodiment of the invention shown in Figs. 10 to 15, inclusive, the winding or tensioning means is shown as having a strap end 14", and the measuring strip 15" is illustrated as being of a character such as disclosed in the first embodiment described. In the present embodiment, the detachable connection between the strap end and the measuring strip includes an element 40 in the form of a rectangular plate made of resilient thin sheet metal and preferably longitudinally curved. This strip, in width, is less than the length of the slot 11 in the casing or holder 10 and, in length, is greater than the length of the slot 11 so that, when it is in the position shown in Fig. 10, it may be passed through the slot, but when in the transverse position shown in Fig. 13, it cannot pass through the slot. The plate 40 is pivoted, as by means of a pin or rivet 41, at its center to the strap end 14" for turning movement in its plane, and which plane is substantially parallel to the plane of the strap end when the latter is extended. The strap end has its free edge 42 rounded or curved about the axis of turning movement of the plate. The strap end also has, at opposite sides of the rivet 41, notches 43. The plate has, to opposite sides of the rivet 41 and disposed along its longitudinal medial center, openings 44 spaced from the rivet at substantially like distances as are the notches 43 so that, when the plate is turned to the transverse position shown in Fig. 13, these openings register with the respective notches. The other element 45 of the detachable connection is carried by the end of the measuring strip and, in the present instance, includes a tongue 46 offset out of the plane of the measuring strip. This element 45, which, for convenience, may be termed a bracket, comprises a narrow strip of metal, the body portion of which is secured against the under surface of the measuring strip by means of rivets 47. The tongue 46 is offset out of the plane of the body portion and above the measuring strip by bending the bracket, as at 48. The end of the measuring strip is notched, as at 49, so as to accommodate the bent portion of the bracket. By so notching the end of the strip, there are provided two wings 50 located at the opposite sides of, but beneath the plane of, the tongue 46.

When the measuring strip is properly connected to the strap end 14'', the parts are in the position shown in Figs. 10 and 11, and in which position the end of the measuring strip lies beneath and engages the under surface of the forward portion of the plate, and the tongue 46 overlies the curved edge of the strap end. Those ends of the openings 44 which are remote from the pivot 41 are slightly further away from that pivot than is the curved edge 42 of the strap end so as to accommodate the bent portion 48 of the bracket 45. When it is desired to detach the measuring strip from the tensioning device, the measuring strip is swung to the position shown in Fig. 15 and, due to the engagement of the bracket 48 in one of the openings 44, the plate is brought to a transverse position where the openings 44 are in registry with the notches 43. The measuring strip may now be detached by merely moving it downwardly away from the strap end, and in which operation the tongue will pass through the notch and opening 44 with which it is now in registry. Obviously, the strap end and the element 40 may have, respectively, but one notch and opening; in the present instance, two such notches and openings are shown so as to permit of separation of the strip from the strap end by swinging the strip in either direction about the pivot 41. It is clear that the measuring strip cannot be disconnected until after the element 40 has been brought to the transverse position shown in Figs. 13, 14 and 15 and in which position the element 40 cannot pass through the slot 11 of the casing. When the element 40 is in this transverse position, it bridges the slot 11 in the direction of the length of the latter. Thus, the act of disengaging the measuring strip automatically brings the element 40 of the detachable connection to a position which will secure the tensioning means against loss or discharge of a stored energy during the time that the coilable measure is detached. When it is desired to again connect the strip to its tensioning means, the tongue 46 is brought into registry with either of the openings 44 and then the strip is moved up against the plate, whereupon the plate and strip are turned through an angle of 90 degrees to the position shown in Fig. 10.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim as my invention:

1. In a measuring rule, a holder having an entrance slot, resilient coiling means within the holder, a flexible measuring strip, and a quick detachable connection between said strip and resilient means comprising an element connected to the resilient means and having a pair of arms normally tending to spring apart and stops on said arms adapted to engage over the edges of the slot when the strip is detached, said connection also comprising means engageable with said stops and positively holding the same against engagement with said casing.

2. In combination, a holder having a slot in its peripheral wall, resilient coiling means in said holder and having a strap end, an element connected to said strap end and having a pair of resilient arms terminating in out-turned pins, and a measuring strip having at one end a pair of aligned but spaced apart eyes adapted to respectively receive said pins, said arms when disconnected from said eyes being adapted to spring apart to a position where said pins overhang the opposite edges of said slot.

3. In a measuring rule, a holder having an entrance slot, resilient coiling means within said holder having a strap end, a flexible measuring strip, and a quick detachable connection between said strap end and measuring strip and including an element pivoted at its central portion to said strap end for swinging movement about an axis transversely of said strap, said element having one end connected to said flexible measuring strip, said element, when the strip is detached, assuming a position where it will not pass through said slot.

4. In combination, a holder having an entrance slot, resilient coiling means within said holder having a strap end, an element pivoted to said strap end and having portions extending in opposite directions from its pivotal point, one of said portions having a transverse pin, and a flexible measuring strip having at one end an eye adapted to receive said pin, said element, when said strip is attached, being generally in the plane of the adjacent ends of said strap and strip, and said element, when the strip is detached, automatically assuming a position at an angle to said plane.

5. In a measuring rule, a holder having an entrance slot, resilient coiling means within said holder and having a resilient strap end the terminus of which normally assumes a curved condition, an element having a central part journalled to said terminus on an axis parallel to the plane of the terminus, a pin to one side of said part, and an arm to the other side of said part, and a flexible measuring strip having at one end an eye adapted to receive said pin.

6. In a measuring rule, a holder, resilient coiling means therein having a strap, a flexible measuring strip, and a quick detachable connection between said resilient means and measuring strip and including a plate-like element pivoted to said strap for turning movement in substantially its own plane, and an element carried by the measuring strip adapted to be interlocked with said strap by means of said first element, when the strip is connected thereto, being adapted to pass into the holder and said element, during the operation of detaching the strip and before detachment thereof, being caused to take a position where it cannot pass into the holder while the strip is detached.

7. In combination, a holder having an entrance slot, resilient coiling means within the holder and having a strap, a flexible measuring strip, and a quick detachable connection between said measuring strip and strap and including a plate-like element pivoted to said strap for turning movement substantially in its own plane, said element having a width less than the length of the slot and a length greater than the length of the slot, said element, when the measuring strip is connected thereto, extending longitudinally of the strap, and said element, when the measuring strip is disconnected, extending transversely of the strap.

8. In combination, a holder having an entrance slot, resilient coiling means within the holder and having a strap, a flexible measuring strip, and a quick detachable connection between said measuring strip and strap and including a plate having a width less than the length of the slot and a length greater than the length of the slot, said plate being pivoted to said strap for turning movement in its own plane, said detachable connection also including an element on said measuring strip, said second element being locked by said first element to said strap when the first element is in a lengthwise position where it may pass through said slot, said strip being detachable only after the first element has been brought to a transverse position and in which position it cannot pass through said slot.

9. In combination, a holder having an entrance slot, resilient coiling means within said holder and having a strap, a flexible measuring strip, and a quick detachable connection between said measuring strip and strap and including a plate pivoted to said strap for turning movement in its own plane, said plate being lesser in width and greater in length than the length of said slot, said strap having its end curved about the axis of said plate and having a notch at one side, said plate having an opening adapted, when the plate is in transverse position, to register with said notch, and a tongue carried by said measuring strip adapted to be inserted through said notch and opening when the plate is in transverse position, said tongue overlying the curved end of said strap and being held in that position by said plate when the latter is in a longitudinally extending position.

10. In a measuring rule, a holder, a flexible measuring strip adapted to be coiled therein, resilient means within said holder for coiling said strip and having a strap end; and a quick detachable connection between said measuring strip and strap end and comprising an element on said strap end having a transversely extending pin and a transversely extending sleeve on said measuring strip adapted to slidably receive said pin, said pin and sleeve being engageable one with the other only by a longitudinal movement of one of them with respect to the other, said element on said strap end being adapted to engage said holder when the strip is detached from said element in order to prevent loss of energy from said resilient means.

11. In a measuring rule, a holder having an entrance slot, a flexible measuring strip, resilient coilable means within said holder for coiling said strip and having a strap end, and a quick detachable connection between said strap end and measuring strip and including an element on said strap end and an element on the end of said measuring strip adapted to be interlocked with said first mentioned element, said first mentioned element having a dimension in one direction greater than the dimension of the slot in the same direction, said first mentioned element being pivoted between its ends to said strap end and having, when the strip is detached therefrom, a crosswise bridging position with respect to the slot with opposite ends overhanging opposed edges of the slot.

12. A measuring rule comprising a casing, a resilient coiling means therein, a flexible measuring strip, an aperture in the casing adapted to receive the strip, a quick detachable connection between the measuring strip and the resilient means, said detachable connection including a single member pivotally secured to the resilient coiling means, and a portion on said member projecting therefrom which pivotally interlocks with the measuring strip about an axis transversely of the strip and is free to normally pass through the aperture when connected to the strip, said interlocking portion automatically engaging the casing adjacent to the aperture whenever the measuring strip is detached therefrom and securing the resilient means against loss or discharge of its stored energy.

13. A coilable measuring device comprising a casing, a coilable measure receivable therein and having sufficient stiffness to normally maintain any portion of the measure withdrawn from the casing in a substantially rectilinear form, resilient means within the casing arranged to aid the coiling of said measure therein but being incapable of providing sufficient tension to coil the measure; and an easily detachable connection between one end of the measure and the resilient means and comprising members respectively connected thereto, said detachable connection being so constructed that it is capable of transmitting a compressive movement between the measure and the resilient means without becoming detached from engagement with said members connected therewith.

14. A coilable measuring device comprising a casing, a coilable measure receivable therein having sufficient stiffness to withstand a longitudinal compressive thrust, resilient means including a coilable flexible member within the casing and arranged to aid the coiling of said measure therein, said resilient means being incapable of overcoming the friction encountered in coiling the measure, a quickly detachable connection comprising a member pivotally connected between an end of the flexible member and an end of the measure, and means connectible between an end of the said member and the measure which is so constructed that the measure may be manually urged into the casing without becoming detached.

15. A coilable measuring device comprising a casing, a coilable measure receivable therein and having sufficient stiffness to normally maintain the portion of the measure withdrawn from the casing in a substantially rectilinear form, resilient means within the casing for aiding and guiding the coiling of said measure, and a quickly detachable connection removably but positively interconnecting the resilient means to an end of the measure and including a member which slidably interlocks with and disengages from the measure in a direction at an angle to the linear tape movement as it is drawn from and pushed into the casing, said connection being so constructed that it will positively transmit a manual thrust between the measure and resilient means without occasioning disengagement of the connection therebetween.

16. A coilable measuring device comprising a casing, a measure arranged to be coilably received therein and having a concavo-convex transverse section which tends to normally maintain the withdrawn portion of the measure in a rectilinear form, resilient means within the casing arranged to aid and guide the coiling of said measure but of itself being incapable of coiling the measure; and a quickly detachable interlocking connection removably but positively interconnecting an end of resilient means to an end of the measure and including a pin and sleeve which slidably interlock and disengage in a direction at an angle to the linear movement of the measure as it is coiled and uncoiled from the casing.

HIRAM A. FARRAND.